(12) United States Patent
Meijer et al.

(10) Patent No.: US 12,469,382 B2
(45) Date of Patent: Nov. 11, 2025

(54) METHOD AND APPARATUS FOR WIRELESS COMMUNICATION

(71) Applicant: NXP B.V., Eindhoven (NL)

(72) Inventors: Rinze Ida Mechtildis Peter Meijer, Herkenbosch (NL); Pramod Rajan Kesavelu Shekar, Bangalore (IN)

(73) Assignee: NXP B.V., Eindhoven (NL)

( * ) Notice: Subject to any disclaimer, the term of this patent is extended or adjusted under 35 U.S.C. 154(b) by 131 days.

(21) Appl. No.: 18/324,712

(22) Filed: May 26, 2023

(65) Prior Publication Data

US 2023/0386320 A1    Nov. 30, 2023

(30) Foreign Application Priority Data

May 31, 2022  (EP) ..................................... 22176547

(51) Int. Cl.
 *G08C 17/02*   (2006.01)
(52) U.S. Cl.
 CPC ..................................... *G08C 17/02* (2013.01)
(58) Field of Classification Search
 CPC .................. G08C 17/02; A61B 5/0017; A61B 5/14532; H04W 4/023; H04W 4/80; G06F 21/577; G06F 21/566
 See application file for complete search history.

(56) References Cited

U.S. PATENT DOCUMENTS

| | | |
|---|---|---|
| 7,962,150 B2 | 6/2011 | Hertzog et al. |
| 8,886,125 B2 | 11/2014 | Agrawal et al. |
| 8,886,247 B1 * | 11/2014 | Price ..................... H04B 1/3838 455/575.4 |
| 9,008,114 B2 | 4/2015 | Maguire |
| 10,046,114 B1 | 8/2018 | Biederman et al. |
| 10,311,661 B2 | 6/2019 | Menard et al. |
| 2009/0055123 A1 | 2/2009 | Razzell |
| 2016/0247378 A1 | 8/2016 | Baczuk et al. |
| 2017/0215131 A1 * | 7/2017 | Qi ......................... H04W 76/10 |
| 2019/0274624 A1 * | 9/2019 | Mazlish ............... A61B 5/0022 |

(Continued)

FOREIGN PATENT DOCUMENTS

WO   WO-2016046105   3/2016

OTHER PUBLICATIONS

Chandni, Kanika Sharma et al.; "Improved Termite Hill Routing Protocol using ACO in WSN"; 2013 International Computer Science and Engineering Conference; Sep. 2013; 6 pages.

(Continued)

*Primary Examiner* — Vernal U Brown

(57) ABSTRACT

A method and apparatus for point-to-point wireless communication between a first wireless communication device, the first wireless communication device configured as an on-body device and a second wireless communication device. A distance between the first wireless communication device and the second wireless communication device by a ranging measurement is determined. In response to the distance being less than a distance threshold value, data of a first data type is transmitted from the first wireless communication device to the second wireless communication device. In response to the distance being greater than the distance threshold value, data of a second data type is transmitted from the first wireless communication device to the second wireless communication device.

17 Claims, 7 Drawing Sheets

(56) References Cited

U.S. PATENT DOCUMENTS

| | | | |
|---|---|---|---|
| 2020/0106877 A1 | 4/2020 | Ledvina et al. | |
| 2022/0035927 A1* | 2/2022 | Lysecky | G06F 21/566 |

OTHER PUBLICATIONS

Chi, Yuan-Po et al.; "TARS: An Energy-Efficient Routing Scheme for Wireless Sensor Networks with Mobile Sinks and Targets"; 2012 IEEE 26th International Conference on Advanced Information Networking and Applications; Mar. 2012; 8 pages.

Dorris, Parker; "Better Together: How Combining UWB and Bluetooth Low Energy Enables Innovation"; https://www.nxp.com/company/blog/better-together-how-combining-uwb-and-bluetooth-low-energy-enables-innovation:BL-UWB-AND-BLUETOOTH-LOW-ENERGY; Aug. 2021 ; 5 pages.

IEEE; "IEEE 11073 Standards Committee—Personal Health Device"; Retrieved from internet https://sagroups.ieee.org/11073/phd-wg/#:~:text=IEEE%2011073%20Personal%20Health%20Device,glucose%20monitors%20and%20the%20like on May 17, 2023; 2 pages.

ISO/IEEE; "11073-20601 Health informatics—Personal health device communication—Part 20601: Application profile—Optimized exchange protocol"; ISO/IEEE 11073-20601:2016(E); Jun. 15, 2016, doi: 10.1109/IEEESTD.2016.7842820.; 252 pages.

Kadiravan, G. et al.; "A State of Art Approaches On Energy Efficient Routing Protocols in Mobile Wireless Sensor Networks"; IIOAB Journal; Sep. 2017; 5 pages.

Ketshabetswe, Lucia Keleadile et al.; "Communication protocols for wireless sensor networks: A survey and comparioson"; https://www.ncbi.nlm.nih.gov/pmc/articles/PMC6531673/pdf/main.pdf; Apr. 2019; 43 pages.

Kusy, Branislav et al.; "Predictive QoS Routing to Mobile Sinks in Wireless Sensor Networks"; 2009 International Conference on Information Processing in Sensor Networks; Apr. 2009; 12 pages.

Lee, Jung Woo et al.; "Whirlpool Routing for Mobility"; 11th ACM International Symposium on Mobile Ad Hoc Networking and Computing, MobiHoc 2010; Dec. 2010; 11 pages; DOI: 10.1145/1860093.1860112.

Li, Zhenjiang et al.; "Ubiquitous Data Collection for Mobile Users in Wireless Sensor Networks"; 2011 IEEE INFOCOM; Apr. 2011; 9 pages.

Medical Devices WG; "Health Device Profile Implementation Guidance Whitepaper V10r00"; https://www.bluetooth.com/wp-content/uploads/2019/03/HDP-Implementation_WP_V10.pdf; Dec. 2009; 54 pages.

MedPage; MedPage Micro GPS Location Tracker with integrated Fall Sensor; Retrieved from internet https://www.medpage-ltd.com/micro-gps-location-tracker-integrated-fall-sensor on May 15, 2023; 5 pages.

Microwaves & RF; "What's the Difference Between Bluetooth Low Energy, UWB, and NFC for Keyless Entry?"; Retrieved from internet https://www.mwrf.com/technologies/systems/article/21140621/litepoint-whats-the-difference-between-bluetooth-low-energy-uwb-and-nfc-for-keyless-entry on May 15, 2023; 6 pages.

Ometov, Aleksandr et al.; "A Survey on Wearable Technology: History, State-of-the-Art and Current Challenges"; Computer Networks, vol. 193, 5; https://doi.org/10.1016/j.comnet.2021.108074; Jul. 2021; 37 pages.

Shi, Lei et al.; "An Efficient Data-Driven Routing Protocol for Wireless Sensor Networks with Mobile Sinks"; 2011 IEEE International Conference on Communications; Jun. 2011, 5 pages.

Wang, Guojun et al.; "Adaptive location updates for mobile sinks in wireless sensor networks"; J. Supercomput; DOI 10.1007/s11227-008-0181-5; Mar. 2008; 19 pages.

Wannachai, Autanan et al.; "Adaptive Transmission Range Based on Event Detection for WSNs"; 2015 IEEE Tenth International Conference on Intelligent Sensors, Sensor Networks and Information Processing; Apr. 2015; 6 pages.

Zungeru, A.M. et al.; "Termite-hill: Routing Towards a Mobile Sink for Improving Network Lifetime in Wireless Sensor Networks"; 2012 Third International Conference on Intelligent Systems Modelling and Simulation; Feb. 2012; 6 pages.

Zungeru, Adamu Murtala et al.; "Termite-hill: Performance optimized swarm intelligence based routing algorithm for wireless sensor networks"; Journal of Network and Computer Applications 35; Jul. 2012; 1901-1917.

\* cited by examiner

METHOD AND APPARATUS FOR WIRELESS COMMUNICATION

CROSS-REFERENCE TO RELATED APPLICATIONS

This application claims the priority under 35 U.S.C. § 119 of European Patent application no. 22176547.2, filed on 31 May 2022, the contents of which are incorporated by reference herein in its entirety.

FIELD

This disclosure relates to a method and apparatus for point-to-point wireless communication between a first wearable wireless communication device, and a second wireless communication device.

BACKGROUND

IoT (Internet of Things) devices are increasingly common in many applications. In some healthcare applications, Smart IoT "Edge" devices may be body-worn wearable devices that are used close to the patient's body for monitoring a healthcare condition for example glucose levels or therapy support for example insulin injection. These body-worn wearable devices are increasingly implemented as ' single-use' disposable devices. These body-worn devices typically communicate to reader and/or control devices, such as smart phones or the like, via a wireless communication link which may be implemented using for example a near-field communication (NFC) or Bluetooth Low Energy (BLE) communication.

Example use-case applications include sensing a patient's health parameters with a body-worn smart IoT Edge device, and providing them to the reader devices for data logging purposes and historic trends, sensing patient's health parameters with a smart IoT Edge device, and providing alerts at reader devices when those parameters are not within target range. Further examples include having therapy settings (e.g. insulin dosage) on control devices, which are then transmitted to smart IoT edge device for application (for example e.g. smart insulin pump)—this while maintaining logging at control device and sensing therapy related information at a IoT edge device, for example time-stamped dose logging at the insulin pen which is then provided to the reader device for data logging purposes and historic trends.

Body-worn smart IoT edge devices are typically form-factor constrained, light-weight, coin-cell battery-powered and increasingly more and more cost-optimised. Depending on the use-case, these devices are able to operate for several days (e.g. insulin pumps, cardiac patches), several weeks (e.g. remote patient monitoring patches, continuous glucose monitor (CGM) or smart inhalers) or up to several months (e.g. insulin pens). Battery size and in turn battery capacity is aimed to be as small as possible, driven by solution size, weight, cost, and environmental (ecological) footprint this can be enabled by reducing the power consumption.

Reader/control devices are typically implemented as dedicated durable, re-usable devices as provided by the medical device company, or consumer smart devices such as smartphone or the like. These devices are usually very featured, capable of heavy processing tasks and data storage. They are typically powered from rechargeable batteries.

SUMMARY

Various aspects of the disclosure are defined in the accompanying claims.

In a first aspect there is provided a method of point-to-point wireless communication between a first wireless communication device, the first wireless communication device configured as a wearable device and a second wireless communication device, the method comprising: determining a distance between the first wireless communication device and the second wireless communication device by a ranging measurement; in response to the distance being less than a distance threshold value, transmitting data of a first data type from the first wireless communication device to the second wireless communication device; and in response to the distance being greater than the distance threshold value, transmitting data of a second data type from the first wireless communication device to the second wireless communication device.

In one or more embodiments, the first wireless communication device may comprise a physiological sensor, the first data type may comprise physiological sensor data, and the second data type may comprise notifications or alerts.

In one or more embodiments, the first wireless communication device is configured as a continuous glucose monitor and wherein the physiological sensor is configured to detect a glucose level of a user wherein the first data type comprises glucose level values.

In one or more embodiments, the first wireless communication device may further comprise a haptic feedback module, and the method may further comprise analysing the detected glucose levels and in response to an anomaly in glucose levels being detected performing at least one of: generating an authentication error; transmitting data of the second data type; generating a haptic feedback signal; and generating an audible alert.

In one or more embodiments, the method may further comprise transmitting data of the second data type by the first wireless communication device to the second wireless communication device in response to data of the first data type being available to transmit from the first wireless communication device.

In one or more embodiments, the method may further comprise: in response to the distance being less than the threshold value, transmitting data by the first wireless communication device at a first transmit power level and, in response to the distance being greater than or equal to the threshold value transmitting data by the first wireless communication device at a second transmit power level higher than the first transmit power level.

In one or more embodiments, the first wireless communication device may comprise a motion detector and the method further comprises determining the distance between the first wireless communication device and the second wireless communication device in response to a motion of the first wireless communication device being detected.

In one or more embodiments, the method may further comprise: periodically determining the distance between the first wireless communication device and the second wireless communication device.

In one or more embodiments, data of at least one of the first data type and second data type may be packetized for transmitting in a first data packet type comprising a first number of data-bytes and packetized for transmitting in a second data packet type comprising a second number of data-bytes wherein the second number of data-bytes is greater than the first number of data-bytes.

In one or more embodiments, the first wireless communication device may further comprise a battery level monitor to configured to monitor a charge level of a battery providing power to the first wireless communication device, and wherein the method further comprises transmitting the data in the first data packet type in response to the charge level being greater than a battery charge level threshold and transmitting the data in the second data packet type in response to the charge level being less than the battery charge level threshold.

In one or more embodiments, the may method further comprise adapting the transmit power and the distance threshold value dependent on the battery charge level.

In one or more embodiments, the first wireless communication device may comprise a memory configured to store physiological sensor data for compiling by the processing unit for transmission, and the method may further comprise: determining an amount of available memory space; and in response to amount of available memory space being less than a first memory threshold value and the distance being greater than or equal to the threshold value, performing at least one of: transmitting data of the second data type from the first wireless communication device to the second wireless communication device; generating an audible alert; and generating a haptic alert.

In one or more embodiments, the method may further comprise: in response to the distance being greater than the distance threshold value, transmitting only data of the second data type.

In one or more embodiments, the method may further comprise: in response to amount of available memory space being less than a second memory threshold value which is less than the first memory threshold value, performing at least one of: transmitting data of the first data type and the second data type; and generating an audible alert; and generating a haptic alert.

In a second aspect, there is provided a wearable wireless communication device comprising: a processing unit; an RF transceiver coupled to the processing unit; wherein the processing unit is configured to: determine a distance between the wearable wireless communication device and a further wireless communication device by transmitting a signal via the RF transceiver and receiving the signal from the RF transceiver and performing a ranging measurement; in response to the distance being less than a distance threshold value, transmitting data of a first data type via the RF transceiver to the further wireless communication device; and in response to the distance being greater or equal to the distance threshold value, transmitting data of a second data type via the RF transceiver to the further wireless communication device.

In one or more embodiments, the wearable wireless communication device may further comprise a physiological sensor coupled to the processing unit, wherein the first data type comprises physiological sensor data, and the second data type comprises notifications or alerts.

In one or more embodiments, the processing unit may be further configured to transmit data of the second data type to the further wireless communication device via the RF transceiver in response to data of the first data type being available to transmit from the wearable wireless communication device.

In one or more embodiments, the processing unit may be further configured to control the RF transceiver to transmit data at a first transmit power level in response to the distance being less than the distance threshold value and, to transmit data at a second transmit power level higher than the first transmit power level in response to the distance being greater than or equal to the distance threshold value.

In one or more embodiments, the processing unit may be further configured to packetize data of at least one of the first data type and second data type for transmitting in a first data packet type comprising a first number of data-bytes or configured to packetize data for transmitting in a second data packet type comprising a second number of data-bytes, wherein the second number of data-bytes is greater than the first number of data-bytes; and wherein the wearable wireless communication device further comprises a battery level monitor coupled to the processing unit, the battery level monitor configured to monitor a charge level of a battery providing power to the wearable wireless communication device, and wherein the processing unit is further configured to transmit the data in the first data packet type in response to the charge level being greater than a battery charge level threshold and transmit the data in the second data packet type in response to the charge level being less than the battery charge level threshold.

In a third aspect, there is provided a non-transitory computer readable media comprising a computer program comprising computer executable instructions which, when executed by a computer, causes the computer to perform a method of point-to-point wireless communication between a first wireless communication device, the first wireless communication device configured as a wearable device and a second wireless communication device, the method comprising: determining a distance between the first wireless communication device and the second wireless communication device by a ranging measurement; in response to the distance being less than a distance threshold value, transmitting data of a first data type from the first wireless communication device to the second wireless communication device; and in response to the distance being greater or equal to the distance threshold value, transmitting data of a second data type from the first wireless communication device to the second wireless communication device.

BRIEF DESCRIPTION OF THE DRAWINGS

In the figures and description like reference numerals refer to like features. Embodiments are now described in detail, by way of example only, illustrated by the accompanying drawings in which.

DETAILED DESCRIPTION OF EMBODIMENTS

Figure 1:
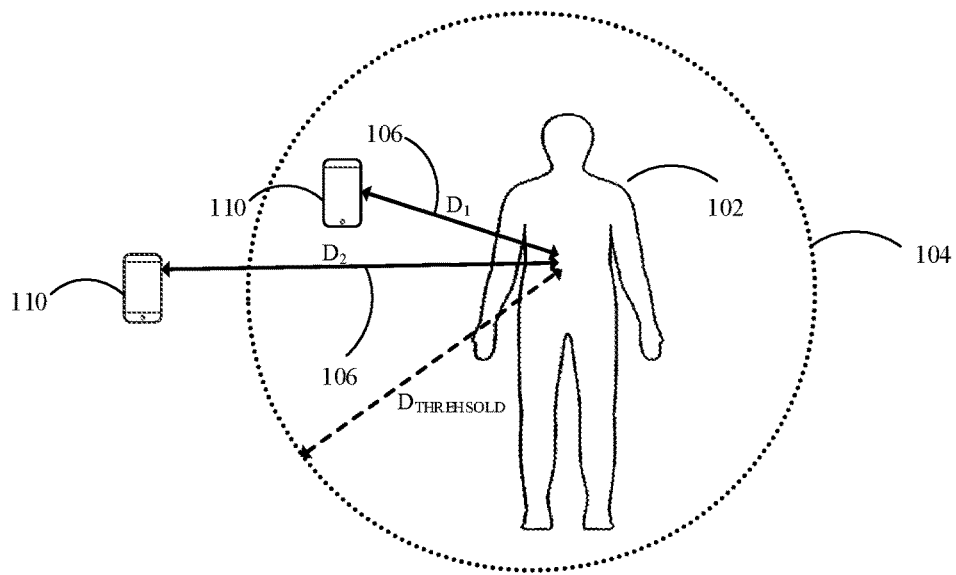
FIG. 1 shows an overview of the location of a first and second wireless communication device according to an embodiment.

FIG. 1 shows a first wireless communication device 100 and second wireless communication device 110 according to an embodiment. The first wireless communication device 100 is a wearable device worn by a user 102 such as a continuous glucose monitoring device. In other examples, the first wireless communication device 100 may be another wearable device such as a smartwatch, bracelet, or any other body worn device. The first wireless communication device 100 and second wireless communication device 110 both include a wireless transceiver which may for example be a Bluetooth, Near-field magnetic induction (NFMI), Ultra-Wide Band (UWB) or other wireless transceiver. The second wireless communication device 110 may be a mobile communications device such as a mobile phone or may be any other device including an RF transceiver. As illustrated the second wireless communication device 110 may be located at a distance $D_1$ within a radius $D_{THRESHOLD}$ of circle 104 of the first wireless communication device 100 and consequently the user 102 and communicate with the first wireless communication device 100 via the RF link 106. Alternatively the second wireless communication device 110 may be at a distance D2 greater than the distance threshold indicated $D_{THRESHOLD}$ from the first wireless communication device 100.

Figure 2:
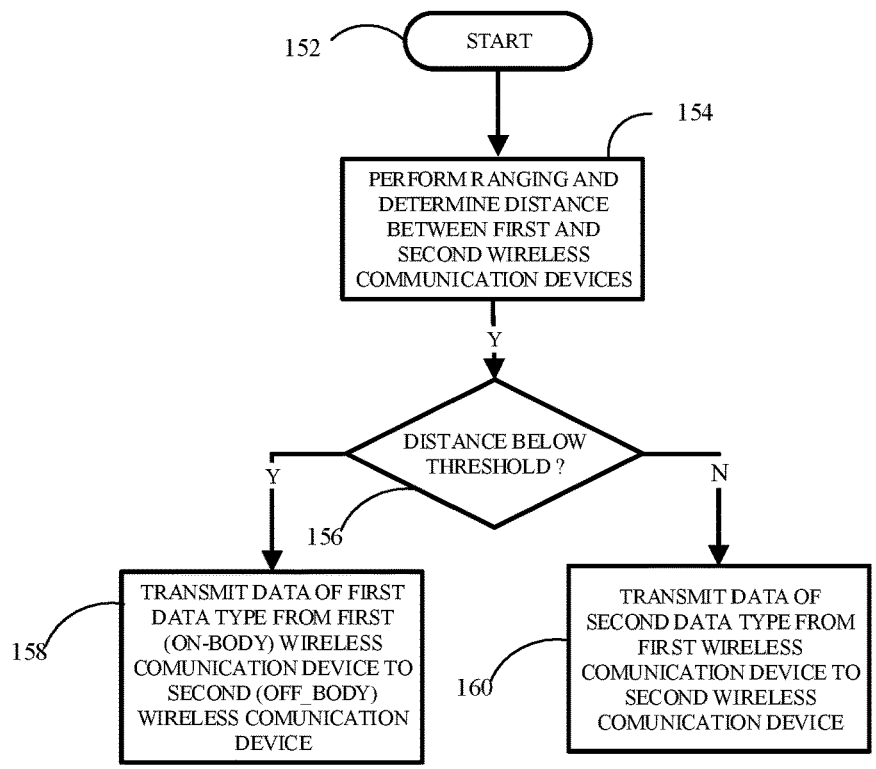
FIG. 2 shows a method of wireless communication of the first and second wireless communication device of FIG. 1 according to an embodiment.

FIG. 2 illustrates a method of operation 150 of the wireless communication devices 100, 110 illustrated in FIG. 1. In step 152, the method starts, this may start for example at periodic intervals controlled by a timer or in response to a movement of a user being detected. In step 154, the first wireless communication device 100 may initiate a ranging operation such as a time-of-flight measurement to determine the distance between the first wireless communication device 100 and the second wireless communication device 110. In other examples the ranging operation may be a received signal strength indication (RSSI) measurement or combined RSS and angle of arrival measurement. In step 156, a comparison is made between the determined distance and the threshold distance value $D_{threshold}$. If the distance is below the threshold value, then in step 158 the first wireless communication device 100 may transmit data of a first datatype to the second wireless communication device via the point-to-point RF link 106. If the distance is above the threshold value, then in step 160, the first wireless communication device 100 may transmit data of a second datatype to the second wireless communication device via the RF link 106. Examples of data of the first datatype include sensor data, for example if the first wireless communication device 100 is configured as a CGM, the first datatype may include glucose level data. In other examples, the first datatype may include other physiological sensor data such as heart rate, blood oxygen level, EEG data, ECG data, temperature, and blood pressure. Examples of data of the second datatype includes notifications or alerts. For example notifications or alerts may include but are not limited to an indication that data of the first datatype is available to be transmitted from the first wireless communication device 100, a low battery status alert, a status alert that the memory capacity of the first wireless communication device 100 is getting low, a status alert that the second wireless communication device 110 is at a distance greater than the threshold distance $D_{threshold}$.

The volume of data of the second datatype is significantly lower than the volume of data of the first datatype. By restricting transmission of data of the first datatype, two distances below a certain distance threshold, the power level of the transmitter of the first wireless communication device 100 may be set to a lower amount for transmission of the bulk of the data. Furthermore, by restricting when the transfer of data occurs to a relatively short distance, typically less than 2 metres, the likelihood that data will be intercepted by a third (unauthorized) device, for example by a so-called man in the middle attack may be significantly reduced.

Existing IoT communication solutions may have one or more of the following issues. Body worn smart IoT edge devices wirelessly communicate with the off-body reader/control device. When the reader/control device is a large distance from the patient, the patient is unable to perform control actions and reading of sensor loggings. In this situation, wireless communication between the devices may require a high radio transmit power consumption for example due to the distance involved. This is even without considering any re-transmission. When both devices are in close proximity (e.g. arm's length of a human), the patient is able to use the reader/control device and is in need to having all sensor loggings at the reader device, or shall be able to control the on-body device. The same applies for medical personnel, e.g. caretakers of a given patient, who should be in close proximity of the patient for treatment.

A first problem is the high power consumption of the wireless communication between devices when they are far apart which may be up to a range of 10 metres. Current solutions need to account for this larger power for example 0, +2 or +4 dBm corresponding to around 10 mA current consumption, and the battery capacity of the primary battery inside the 'single-use/disposable' smart IoT edge device is chosen to meet the higher power requirements. This may result in a higher battery price, larger form factor, and larger ecological footprint. This larger battery may also increase the height of the device which for example may be undesirable for wearable patches as it may be more inconvenient for a user.

A second problem is the radio peak current when communicating between devices over a larger distance. A higher peak current mandates 'stronger' and better quality batteries, that can avoid drop in battery voltage during the communication (due to internal battery impedance). When communicating between a short distance between devices, the peak currents are significantly reduced. Such scenario enables use of lower cost environmentally friendly batteries (e.g. ZincAir, printed batteries) or even may allow battery less operation from energy harvested supply.

A third problem is the higher probability that other devices than the reader/control device can receive the (coded) RF signal when transmitting with a higher output power. This gives room to security threats (e.g. eaves dropping, man in the middle attacks) that can result into privacy issues (e.g. CGM data, dose loggings) and safety concerns (e.g. insulin pump/pen). Ensuring sensitive data over a small distance enhances security, as proven by NFC as an extreme small distance example.

A possible alternative could be to request data transfer from the smart IoT edge device by the reader device itself. In such case, a fourth problem occurs with the latency of the data available at the reader device, the need for potential large data storage on the body worn device as well as a dedicated action by the patient to get the data on the reader device. Hence, this approach is not providing the needed patient convenience (i.e. no additional actions shall be needed from the patient), as well as higher solution cost due to potentially large memory storage needs at the smart IoT Edge device.

The system of FIG. 1 and the method of FIG. 2 proposes a system and method for smart IoT edge devices which are on-body or close to body, that communicate to off-body reader/control devices in the following manner:

Normal/Low priority data communication only done when the smart IoT edge device is within given (up to ~2 meters) distance to the off-body reader/control device.

The communication may then be done with radio power consumption/Tx power configured as a minimum for the given distance threshold. For example, for ranging the transmit power may be at a high Tx power for example at 0 dBm for distances up to 10 metres. Transmitting bulk data may be done at a relatively low transmit power for example—12 dBm, at distances less than 2 m. This may reduce power consumption, peak current and alleviate security risks.

High-priority data communication (e.g. alerts) may be transmitted without a distance constraint, provided connection between devices can be maintained or established. For high-priority data, radio power consumption is not constrained by the given set threshold. In some examples, an alert function may be present on the IoT edge device itself such as a haptic event or the like which may ensure that the user gets triggered when the reader device is not in the user's proximity.

The Smart IoT edge device pushes the data to the reader/control device. The system and method described may account for the distance between devices as well as battery charge available i.e. energy aware communication. In some examples the distance threshold $D_{threshold}$ may be set lower together with a lower transmit power setting. For example, if a battery level becomes low which may be for example less than 20% charge left, $D_{threshold}$ may be reduced from 2 metres to 1 metre and the transmit power reduced. If the battery level reduces further, for example to 10 percent charge, $D_{threshold}$ may reduce further and the corresponding transmit power may reduce further.

Embodiments described may be able to deal with static conditions of devices, as well as dynamic conditions in which one or both devices are changing position. Distance based measurement may be applied, i.e. so-called ranging or time-of-flight measurement, in order to have an accurate distance measurement. Distance based measurement is done while accounting for this knowledge, in order to minimize power consumption of this measurement.

Figure 3:
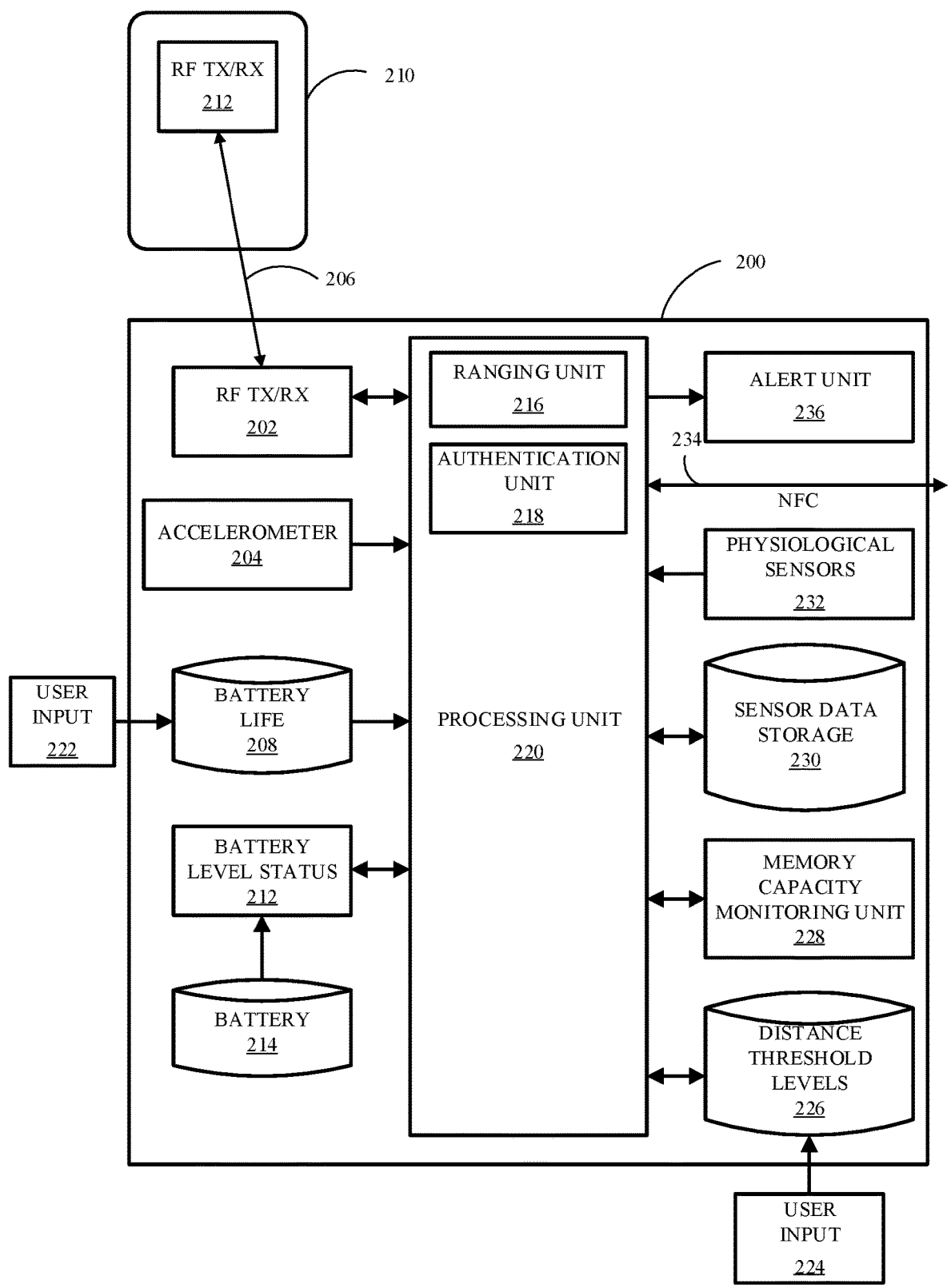
FIG. 3 shows a system for physiological monitoring including an IoT device and a mobile device according to an embodiment.

FIG. 3 shows a system for vital sign monitoring including an IoT (on-body) device 200 and a mobile (off body) device 210 for example a smart phone according to an embodiment. The on-body device 200 includes a processing unit 220 which may be a microprocessor, microcontroller or other processor. The on-body device 200 may further include the following modules which are coupled to the processing unit 220: a ranging unit 216, an authentication unit 218, an RF transceiver 202, an accelerometer 204 which may be used as a motion detector, a battery life status monitor 208, a battery level status monitor 212 coupled to a battery 214, a haptic alert unit 236, an NFC link 234, a physiological sensor or sensor module 232, a sensor data storage (memory) 230 for storing sensor data, such as for example glucose measurements, a memory capacity monitoring unit 228, and a memory for storing distance threshold levels 226 which may also be referred to as a distance threshold storage unit. A user input 222 may be provided to the battery life status monitor 208. A user input 224 may be provided to set distant threshold levels 226. The off-body device 210 has a RF transceiver 202 which forms a point-to-point radio link 206 with the on-body device 200 to receive the data from the on-body device 200.

In some examples, the battery life status monitor 208, the accelerometer 204, the memory capacity monitoring unit 228, the NFC link 234, and the haptic alert unit 236 may be omitted.

The operation of the components of the IoT device 200 is as follows. The RF Transceiver 202 may performs two functions: Firstly for exchange of data from the on body device 200 to off body device 210 and secondly for performing the ranging operation together with the processing unit 220 to determine the distance between the off body device 210 and on body device 200. For example, if the RF transceiver 202 supports UWB and BLE protocols, ranging could be performed using UWB and exchange of data could be performed using BLE. Alternatively a single RF protocol such as UWB or BLE could be used for example BLE could perform both ranging and exchange of data. The optional NFC link 234 may be used for initial pairing of the off body device 210 with on body device 200 and for re-pairing when the authentication error is reported.

The accelerometer 204 may be used to determine the movement or motion of the user. A movement trigger is generated by the accelerometer 204 when the user is in motion. The generated trigger is input to processing unit 220.

The ranging unit 216 may computes the distance by ranging between the on-body device 200 and the off-body device 210 for example by a Time of Flight (ToF) measurement using UWB or BLE communication protocols.

The authentication unit 218 may include a stored unique off-body device ID. The authentication unit 218 may authenticate a connection (pairing) of the off-body device 210 with the on body device 200. The authentication unit 218 may also validate every data exchange between the devices to check for authenticity of the data transmitted from the paired device. A re-pairing may be required for any authentication error reported.

The physiological sensors 232 may detect physiological signals of the user for example glucose levels of the user. Sensor data such as measured glucose levels may be stored in the sensor data storage unit 230 (memory). Programmable distance threshold levels for data transmission is stored in distance threshold storage unit 226. The user input 222 may set the battery life value, the user input 224 may program the distance threshold level or levels.

The alert unit 236 may alert the user in response to any anomaly detected, for example a variation or disturbance in the collected sensor data pattern, or for any abnormal readings observed in the monitored sensor data such as abnormally low or high glucose levels, blood O2 levels, heart rate, blood pressure of the user. The alert unit 236 may give feedback to user and may for example be a sound buzzer or a haptic feedback system.

The battery level status monitor 212 may monitor the charge levels of battery 214 and provides input to the processing unit 220.

Figure 4:
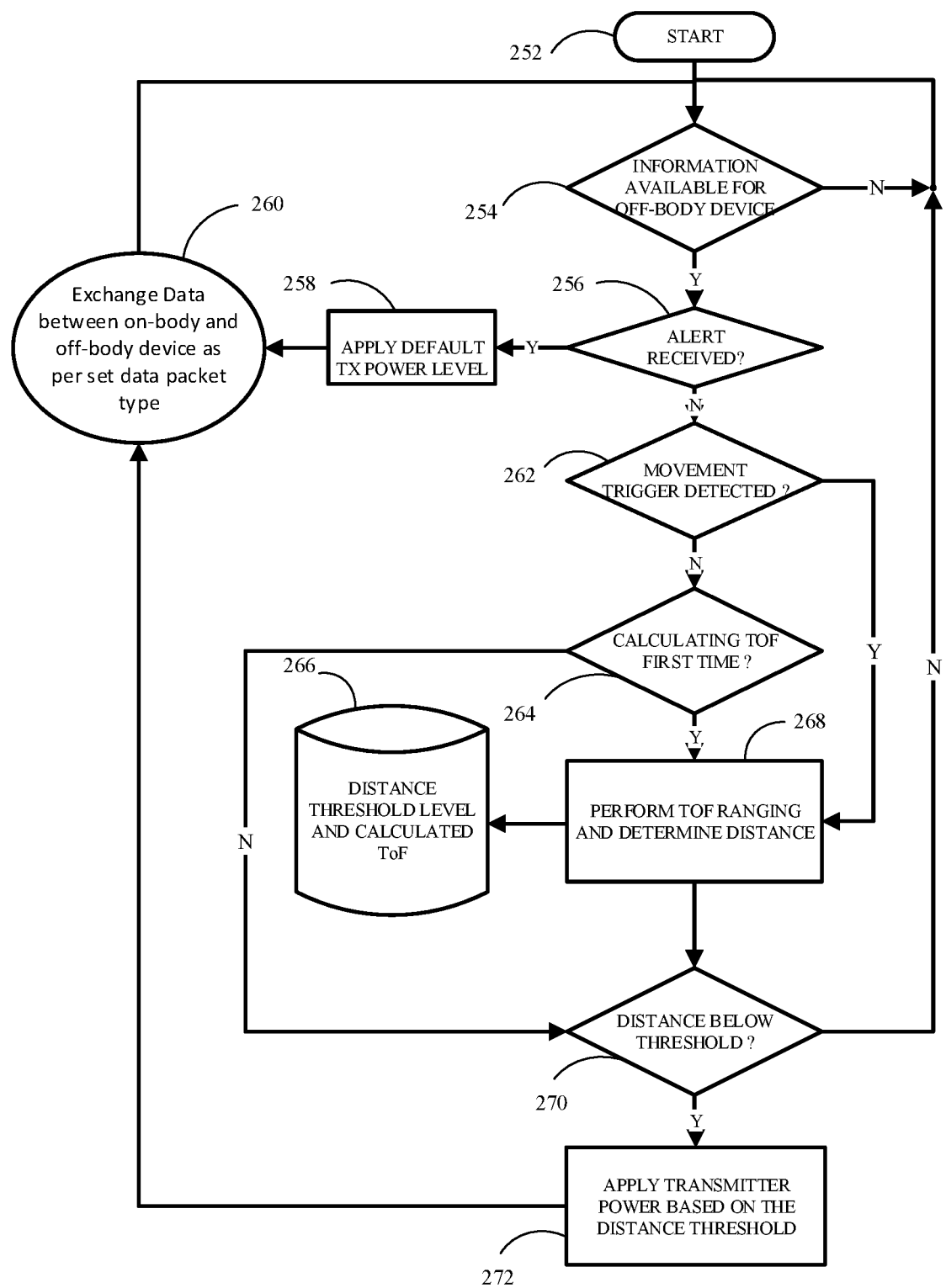
FIG. 4 shows a method of wireless communication of the first and second wireless communication device of FIG. 3 according to an embodiment.

The processing unit 220 may perform the following processes: Computing the distance between the on-body and off-body device by ranging with inputs from RF transceivers; evaluating if the data can be exchanged between the devices if the computed distance is less than the threshold limits; computing the energy required to power up the RF transmitter to transmit the data for a given distance; monitoring the battery health condition and indicating the status with the battery status indicator; and performing packetising of the data structure to be transmitted based on the computed energy levels required at the measured distance. The packet data structure may be either a normal packet data type or a low power packet data type. The processing unit 220 may also analyse the collected data/sample levels and check for any abnormalities in the pattern and output an alert signal to the alert unit 236 and via the RF transceiver 202 communicate an alert to the off-body device 210 if an abnormal pattern is detected. An abnormal pattern may be detected by comparing a measured level such as a glucose level with a preloaded profile. The processing unit 220 may generate an alert indicating potential tampering of the physiological sensors 232 for example for CGM samples. The processing unit 220 may generate an alert signal if the sensor data storage unit 230 has reached a maximum threshold limit. In some examples, the on-body unit 210 may be a continuous glucose monitoring (CGM) device which monitors glucose levels. In some examples the on-body unit may monitor other physiological parameters including but not limited to blood pressure, blood oxygen levels, electrolyte levels, body temperature FIG. 4 shows a method of operation 250 of the system illustrated in FIG. 3. In step 252 the method starts. The on body device 200 checks whether any information is available for the off body device 210 (step 254). If information is available then the on body device 200 and checks whether there is an alert (step 256), otherwise the method remains at step 254. If there is an alert then the on body device 200 applies a default power level (step 258) and then data may be exchanged between the on body device 200 and the off body device 210 with a defined data packet format (step 260). Returning to step 256, if an alert has not been received then a check is made to see if a movement trigger has been detected (step 262). If a movement trigger has not been detected then a check is made (step 264) to determine whether the time-of-flight has been calculated corresponding to the distance between the on body device 200 and the off body device 210. In other examples, the distance may be determined by other ranging methods such as RSSI or a combination of RSSI and angle of arrival. If the time-of-flight has not been calculated, then time-of-flight ranging is performed to determine the distance (step 268) and the resulting time-of-flight calculation may be stored (step 266). Following the calculation of the time-of-flight ranging, the method may check whether the calculated distance is below a predetermined threshold distance value (step 270). If the distance is below the threshold value then in step 272, the transmitter power may be applied based on the distance threshold in step 272 and then data may be exchange between the on body device 200 the off body device 210 as per the set data packet type (step 260). Returning to step 270 if the distance is not below the threshold then the method returns to step 254. Returning to step 262 if a movement trigger has been detected, then the method 250 moves directly to step 268 to perform flight ranging and determine the distance as previously described.

Figure 5:
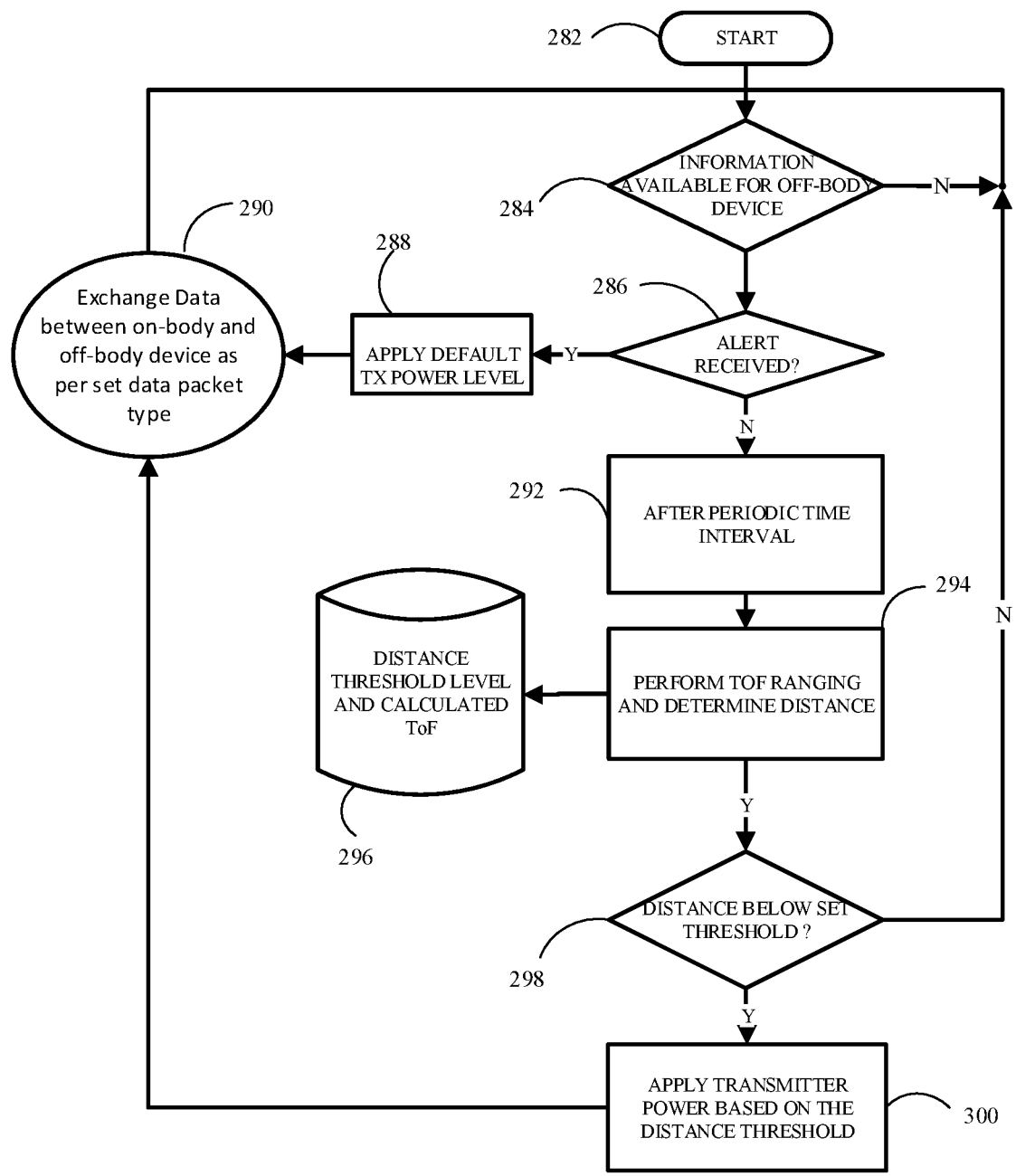
FIG. 5 shows a method of wireless communication for a first and second wireless communication device according to an embodiment.

FIG. 5 shows a method of operation 280 of the system illustrated in FIG. 3. In step 282 the method starts. The on body device 200 checks whether any information is available for the off body device 210 (step 284). If information is available then the on body device 200 and checks whether there is an alert (step 286), otherwise the method remains at step 284. If there is an alert then the on body device 200 applies a default power level (step 288) and then data may be exchanged between the on body device 200 and the off body device 210 with a defined data packet format (step 290). Returning to step 286, if an alert has not been received then the method waits for a (periodic) time interval (step 292). After the time interval then time-of-flight ranging is performed to determine the distance (step 294) and the resulting time-of-flight calculation may be stored (step 296). Following the calculation of the time-of-flight ranging, the method may check whether the calculated distance is below a predetermined threshold distance value (step 298). If the distance is below the threshold value then in step 300, the transmitter power may be applied based on the distance threshold. Data may then be exchanged between the on body device 200 the off body device 210 as per the set data packet type (step 290). Returning to step 298, if the distance is not below the threshold then the method returns to step 284.

Figure 6A:
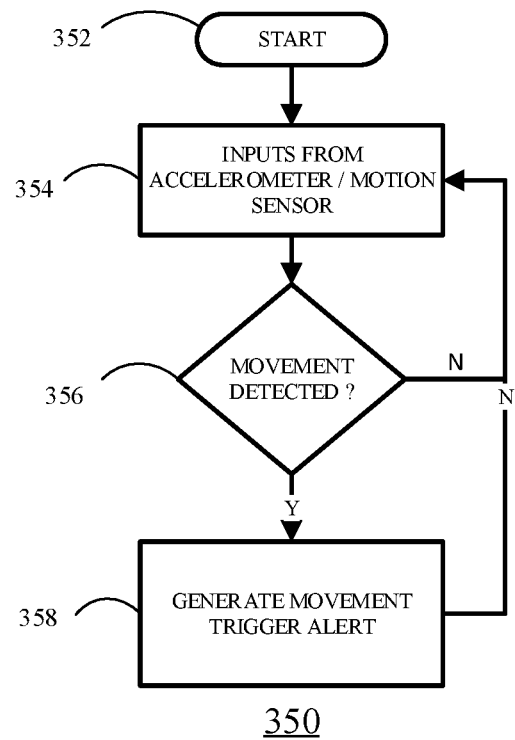
FIG. 6A illustrates a method for movement detection for the system of FIG. 3.

FIG. 6A illustrates a method for movement detection 350 for the on-body device 200 of FIG. 3. In step 352 the method starts. Inputs are then received from the accelerometer or other motion sensor (step 354). A check is then made to see if any movement has been detected (step 356). If movement has not been detected then the method returns to step 354, otherwise a movement trigger alert may be generated (step 358) followed by a return to step 354.

Figure 6B:
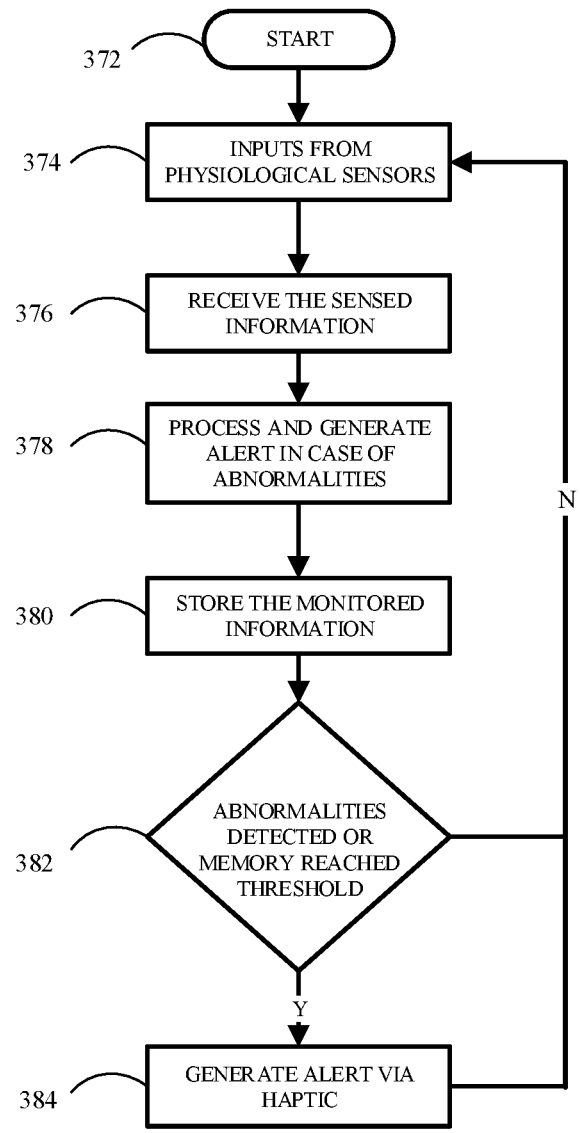
FIG. 6B illustrates a method for glucose level monitoring for the system of FIG. 3.

FIG. 6B shows a method of monitoring glucose levels and/or other physiological data 370 which may be implemented by the on body device 200. In step 372 the method starts. Inputs are then received from physiological sensors 232 (step 374). The sensed information is then received by the processing unit 220 (step 376). The processing unit 220 may then process and generate an alert in case of abnormalities (step 378). The alert may be transmitted to the off body device 210 as notification data. Instead or in addition in some examples an audible and or haptic feedback alert may be generated. The monitored information may then be stored for example in the sensor data store 230 (step 380). The method may then check whether any abnormalities have been detected and/or the memory capacity is within a threshold (step 382). If either abnormalities been detected or the memory capacity has reached a threshold value, then the method may generate an alert (step 384) which may be a haptic feedback directly to the user generated by alert unit 236 or an alert sent via the RF link to the off body device 210. In some examples, if the available memory is less than a second threshold or full, the transmitter may transmit both alert data and glucose level data and/or other physiological data independent of the distance between the on body device 200 and the off body device 210. This may ensure that physiological data being detected does not exceed the memory capacity of the on-body device 200.

Figure 7A:
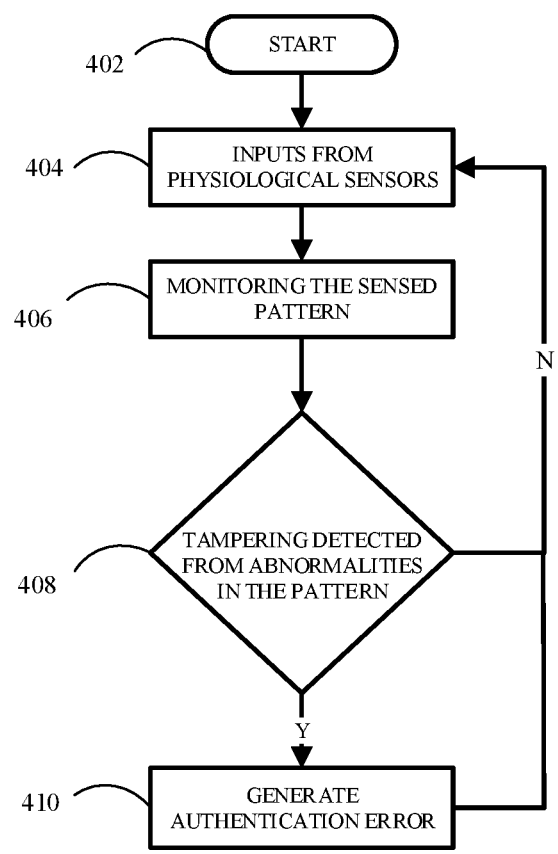
FIGS. 7A and 7B illustrate a method for authentication and tampering detection of the system of FIG. 3.
Figure 7B:
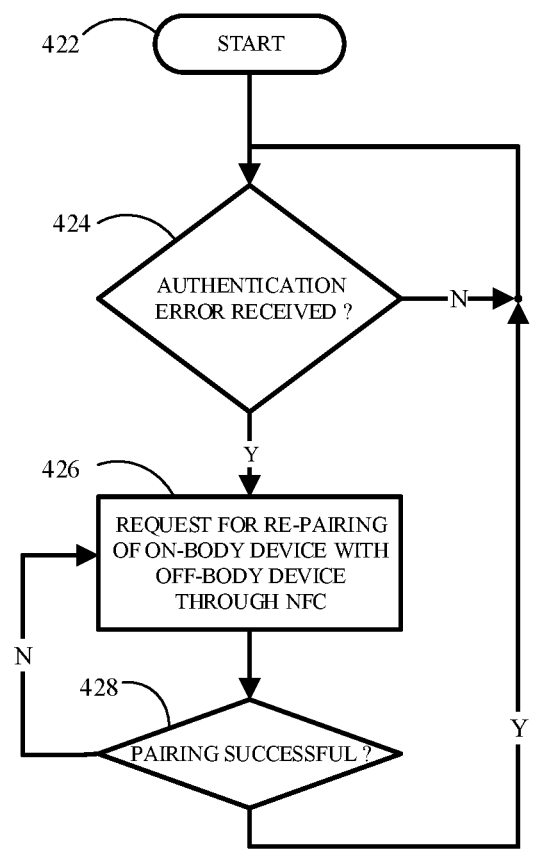

FIGS. 7A and 7B illustrate a method 400 for authentication and tampering detection of the on-body device 200 and a method 420 of re-pairing on-body device 200 and off-body device 210 following an authentication error. Firstly with reference to FIG. 7 a method starts in step 402. Inputs from physiological sensors 232 may be received by the processing unit 220 (step 404). The processing unit 220 may monitor the sensed pattern (step 406). A check may be made to determine whether there are any abnormalities in the detected pattern (step 408) which may result from tampering. If abnormalities are detected then an authentication area may be generated (step 410). The method may then return to step 404. Returning to step 408, if abnormalities are not detected then the method also returns to step 404. Turning now to FIG. 7B, method 420 starts in step 422. A check is then made to see if an authentication error has been received (step 424). This may be an error generated for example by method step 410. If an authentication error has not been received, then the method stays at step 424. Otherwise a request for re-pairing the on body device 200 with the off body device 210 may be made for example as illustrated this may be done for example via NFC if both devices have an NFC link. In other examples different pairing mechanisms may be used, for example standard Bluetooth preparing using identification codes and so on. A check is made to see if the pairings been successful (step 428). If the pairing is unsuccessful method returns to step 426. Otherwise the method returns to step 424.

Figure 8:
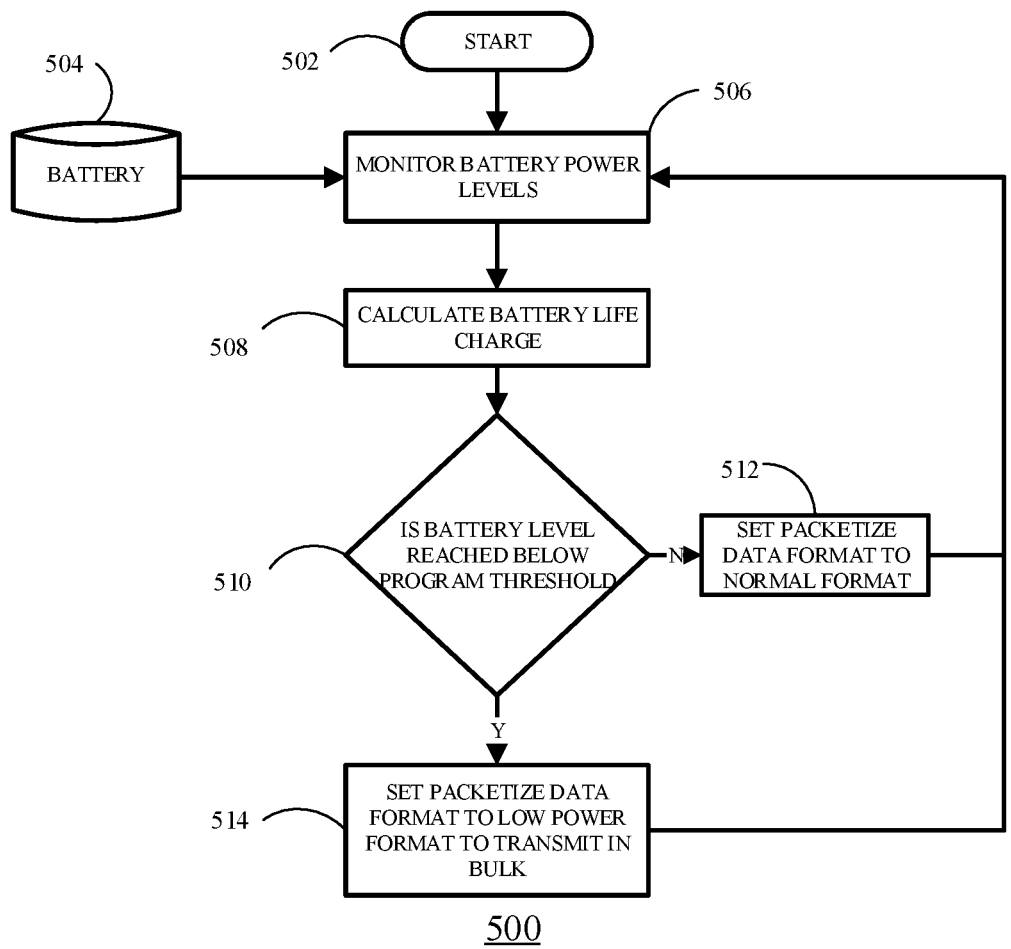
FIG. 8 illustrates a method of wireless communication between a wearable wireless communications device and a further wireless communications device according to an embodiment.

FIG. 8 illustrates a method of wireless communication 500 between a wearable wireless communications device, for example on-body device 200 and a further wireless communications device for example off-body device 210 according to an embodiment. In step 502, the method starts. Battery power levels may be monitored from battery 504, for example by battery level status monitor 212 in on body device 200. The battery life charge may be calculated (step 508) for example by a processing unit 220. A check may be made to determine whether the battery level has reached a level below a program to threshold (step 510). If the battery level is not below the threshold then the data format may be packetized in a first or normal data format (step 512). Otherwise the packetised data format may be set to a second packet data format also referred to as a low-power format (step 514). In either case once the packet data format has been set method returns to step 506. The method 500 allows transfer of bulk data more efficiently by transmitting in bulk once battery levels are below a certain threshold which may reduce the overall power consumption required.

Figure 9:
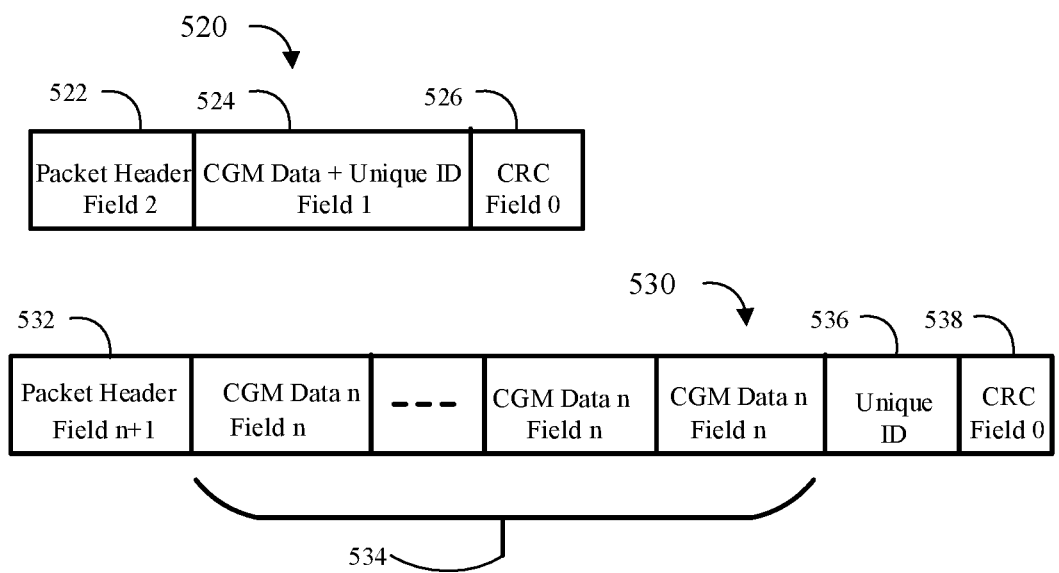
FIG. 9 illustrates data packet formats for use in the method of FIG. 8.

FIG. 9 shows an example of a first packet data format 520 which may also be referred to as a normal data packet format and a second packet data format 530 which may also be referred to as a low power data packet format. The first packet data format 520 consisting of a packet header field 522, a further field 524 consisting of CGM data and/or other physiological sensor data and a unique identifier of the on body device 200. A third field 526 may include a cyclic redundancy check (CRC). The second packet data format 530 may consisting of a packet header field 532, multiple fields 534 consisting of CGM data, unique identifier field 536 for the UID of the on body device 200 and a CRC field 538.

Embodiments describe a low-power system and communication method for RF wireless communication between leader- and follower devices, the leader device being an on-body (wearable device) dependent on at least two data types and the physical distance between those devices. A first data type related to sensory data loggings (or privacy sensitive data) at the leader device, as obtained from sensory functions that are part of the leader device. This data type concerns low-priority data that is communicated to a follower devices only when both devices are within close physical proximity i.e. within a predefined small (up to 2 meters, e.g. reading distance for a human) distance. This data communication shall be done at a reduced transmit power level, corresponding to the needs of the predefined small distance threshold—for saving power and privacy. The data type refers to regular data obtained during use-case application. A second data type related to alerts and/or other important events, as signalled at the leader device. This data type concerns high-priority data that is communicated to a follower device at all times i.e. regardless of distance between devices, as long as a link can be established. This data communication shall be done at an elevated transmit power level—for ensuring communication robustness. The data type refers to 'rare' data events, that need to be signalled to the user at high priority. The leader device being capable to classify the applicable data type, and to perform the related actions for the identified data type.

Leader and follower RF wireless communication devices may be capable of distance based measurement by ranging. The ranging may determine distance for example by a received signal strength indication (RSSI) measurement, a combination of RSSI and angle of arrival measurement, time of flight or other technique and modify power consumption of the wireless transmitter depending on the distance between these devices. Modifying power consumption of the transmitter may depend on the amount of battery charge left, e.g. reduced power when battery becomes empty, energy-aware communication scheme and/or the amount of free memory available. Detection of a physical movement of leader and/or follower devices may be required to decide when data communication is to be performed. A first distance based measurement is to be performed for reference. Distance based measurements may be performed after physical movement detection. Movement detection may be done by means of regular RSSI or regular distance measurement.

An alternative movement detection may use and accelerometer or the like. When movement is detected at the follower device, a signal is provided to the leader device (e.g. part of connection event) to perform distance measurement. Programmable distance threshold for the first data type (e.g. sensory data loggings) may be part of the leader (on body) device. Maximum threshold value relates to maximum distance at which human can read on reader/control device (e.g. up to 2 metres is assumed).

Data communication method between leader- and follower devices, for data of the first data type, that accounts for the available battery charge—this besides the distance based measurement. In some examples. radio power is reduced when the battery level is low, in order to save battery charge. This may potentially minimize communication distance, while aiming at extending battery life.

The wireless communication device and methods described herein may allow on-body to off-body point to point communication which distinguishes between data types depending on the distance between on-body and off-body devices. In a first short transmission range which may be 1 to 2 metres, a first data type including sensor data and a second data type for example including alert data may be transmitted. In a longer range for example 2m-10 m, only a second data type for example including alert data may normally be transmitted. Defining different communication data types may save energy as the second data type has less data. Both static and moving communication devices can be handled as only the relative distance between the devices is significant. The selection of which data type(s) to transmit may be done based on the distance between the on-body and off-body wireless communication devices. The frequency of sensor data transmission may be every time new sensor data is available but only if the on-body and off-body devices are within a relatively short range (1 to 2 metres) of each other. The transmit power may be reduced and/or the data is packetized for transmission when the on-body and off-body devices are within shorter range (1 to 2 metres) to save power. For longer range communication by restricting normal transmission to alerts only, reducing the volume of data transmitted and/or packetizing data for transmission over longer range may also save power.

Alternatively, in some examples, the application duty cycle of the radio communication may be reduced based on remaining battery charge, to save average power, by communicating fewer times but more data at once, to maximize communication efficiency by minimizing communication overheads.

A method and apparatus for point-to-point wireless communication between a first wireless communication device, the first wireless communication device configured as an on-body device and a second wireless communication device. A distance between the first wireless communication device and the second wireless communication device by a ranging measurement is determined. In response to the distance being less than a distance threshold value, data of a first data type is transmitted from the first wireless communication device to the second wireless communication device. In response to the distance being greater or equal to the distance threshold value, data of a second data type is transmitted from the first wireless communication device to the second wireless communication device.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A method of point-to-point wireless communication between a first wireless communication device, the first wireless communication device configured as a wearable medical device and a second wireless communication device, the method comprising:
   determining a distance between the first wireless communication device and the second wireless communication device by a ranging measurement;
   in response to the distance being less than a distance threshold value, transmitting data of a first set of data from the first wireless communication device to the second wireless communication device; and
   in response to the distance being greater than the distance threshold value, transmitting data of a second set of data from the first wireless communication device to the second wireless communication device;
   wherein the first wireless communication device includes a physiological sensor configured to be worn by a person;
   wherein the first set of data is a set of physiological sensor data collected by the physiological sensor from the person;
   wherein the second set of data includes notifications or alerts based on the set of physiological sensor data;
   wherein the first wireless communication device comprises a processing unit and a memory configured to store physiological sensor data for compiling by the processing unit for transmission, and wherein the method further comprises:
   determining an amount of available memory space; and
   in response to amount of available memory space being less than a first memory threshold value and the distance being greater than or equal to the threshold value, performing at least one of: transmitting the second set of data from the first wireless communication device to the second wireless communication device; generating an audible alert; and
   generating a haptic alert.

2. The method of claim 1,
   wherein the first wireless communication device is configured as a continuous glucose monitor and wherein the physiological sensor is configured to detect a glucose level of a user wherein the first set of data is a set of glucose level values from a person wearing the wearable medical device.

3. The method of claim 2,
wherein the first wireless communication device further comprises a haptic feedback module, the method further comprising analyzing the detected glucose level values and in response to an anomaly in glucose levels being detected performing at least one of:
generating an authentication error;
transmitting the second set of data;
generating a haptic feedback signal; and
generating an audible alert.

4. The method of claim 1 further comprising
transmitting the second set of data by the first wireless communication device to the second wireless communication device in response to the first set of data being available to transmit from the first wireless communication device.

5. The method of claim 1, further comprising:
in response to the distance being less than the threshold value, transmitting data by the first wireless communication device at a first transmit power level and, in response to the distance being greater than or equal to the threshold value, transmitting data by the first wireless communication device at a second transmit power level higher than the first transmit power level.

6. The method of claim 1,
wherein the first wireless communication device comprises a motion detector and the method further comprises determining the distance between the first wireless communication device and the second wireless communication device in response to a motion of the first wireless communication device being detected.

7. The method of claim 1 further comprising:
periodically determining the distance between the first wireless communication device and the second wireless communication device.

8. The method of claim 1,
wherein at least one of the first set of data and second set of data is packetized for transmitting in a first data packet type comprising a first number of data-bytes or packetized for transmitting in a second data packet type comprising a second number of data-bytes wherein the second number of data-bytes is greater than the first number of data-bytes.

9. The method of claim 8,
wherein the first wireless communication device further comprises a battery level monitor to configured to monitor a charge level of a battery providing power to the first wireless communication device, and
wherein the method further comprises transmitting the first or second set of data in the first data packet type in response to the charge level being greater than a battery charge level threshold and transmitting the first or second set of data in the second data packet type in response to the charge level being less than the battery charge level threshold.

10. The method of claim 8,
wherein the method further comprises adapting a transmit power and the distance threshold value dependent on the battery charge level.

11. The method of claim 1 further comprising:
in response to the distance being greater than the distance threshold value, transmitting only the second set of data.

12. The method of claim 1 further comprising:
in response to amount of available memory space being less than a second memory threshold value which is less than the first memory threshold value, performing at least one of:
transmitting the first set of data and the second set of data; and
generating an audible alert; and
generating a haptic alert.

13. A wearable medical wireless communication device comprising:
a processing unit;
an RF transceiver coupled to the processing unit;
wherein the processing unit is configured to:
determine a distance between the wearable medical wireless communication device and a another wireless communication device by transmitting a signal via the RF transceiver and receiving the signal from the RF transceiver and performing a ranging measurement;
in response to the distance being less than a distance threshold value, transmitting a first set of data via the RF transceiver to the another wireless communication device; and
in response to the distance being greater or equal to the distance threshold value, transmitting a second set of data via the RF transceiver to the another wireless communication device; and
a physiological sensor configured to be worn by a person and coupled to the processing unit;
wherein the first set of data includes a set of physiological sensor data collected by the physiological sensor from the person;
wherein the second set of data includes notifications or alerts based on the set of physiological sensor data;
further including a memory configured to store physiological sensor data for compiling by the processing unit for transmission, and
wherein the processing unit is further configured to:
determine an amount of available memory space; and
in response to amount of available memory space being less than a first memory threshold value and the distance being greater than or equal to the threshold value, performing at least one of: transmitting the second set of data from the first wireless communication device to the second wireless communication device;
generating an audible alert; and generating a haptic alert.

14. The wearable medical wireless communication device of claim 13,
wherein the processing unit is further configured to transmit the second set of data to the another wireless communication device via the RF transceiver in response to the first set of data being available to transmit from the wearable medical wireless communication device.

15. The wearable medical wireless communication device of claim 13,
wherein the processing unit is further configured
to control the RF transceiver to transmit data at a first transmit power level in response to the distance being less than the distance threshold value and,
to transmit data at a second transmit power level higher than the first transmit power level in response to the distance being greater than or equal to the distance threshold value.

16. The wearable medical wireless communication device of claim 13,
   wherein the processing unit is further
      configured to packetize at least one of the first set of data and the second set of data for transmitting in a first data packet type comprising a first number of data-bytes or
      configured to packetize data for transmitting in a second data packet type comprising a second number of data-bytes,
   wherein the second number of data-bytes is greater than the first number of data-bytes; and
   wherein the wearable wireless communication device further comprises a battery level monitor coupled to the processing unit, the battery level monitor configured to monitor a charge level of a battery providing power to the wearable wireless communication device, and
   wherein the processing unit is further configured to transmit the first or second set of data in the first data packet type in response to the charge level being greater than a battery charge level threshold and transmit the first or second set of data in the second data packet type in response to the charge level being less than the battery charge level threshold.

17. A method of point-to-point wireless communication between a first wireless communication device, the first wireless communication device configured as a wearable device and a second wireless communication device, the method comprising:

determining a distance between the first wireless communication device and the second wireless communication device by a ranging measurement;

in response to the distance being less than a distance threshold value, transmitting data of a first data type from the first wireless communication device to the second wireless communication device; and in response to the distance being greater than the distance threshold value, transmitting data of a second data type from the first wireless communication device to the second wireless communication device;

wherein the first wireless communication device comprises a processing unit and a memory configured to store physiological sensor data for compiling by the processing unit for transmission, and wherein the method further comprises:

determining an amount of available memory space; and in response to amount of available memory space being less than a first memory threshold value and the distance being greater than or equal to the threshold value, performing at least one of: transmitting data of the second data type from the first wireless communication device to the second wireless communication device; generating an audible alert; and generating a haptic alert.

* * * * *